United States Patent [19]
Childress

[11] Patent Number: 5,953,671
[45] Date of Patent: Sep. 14, 1999

[54] SYSTEM AND METHOD FOR PRIORITY GROUP ACCESS

[75] Inventor: Jeffrey S. Childress, Cary, N.C.

[73] Assignee: Ericsson Inc, Research Triangle Park, N.C.

[21] Appl. No.: 08/845,946

[22] Filed: Apr. 30, 1997

[51] Int. Cl.$^6$ ...................................................... H04B 7/00
[52] U.S. Cl. ............................ 455/512; 455/517; 455/519
[58] Field of Search ...................................... 455/512, 416, 455/464, 515, 519, 527, 518, 508, 517, 521

[56] References Cited

U.S. PATENT DOCUMENTS

| | | | |
|---|---|---|---|
| Re. 32,789 | 11/1988 | Lynk, Jr. et al. | 455/512 |
| 4,716,407 | 12/1987 | Borras et al. | 340/825.04 |
| 5,077,828 | 12/1991 | Waldroup | 455/186.1 |
| 5,125,102 | 6/1992 | Childress et al. | 455/9 |
| 5,134,714 | 7/1992 | Janzen et al. | 455/54.2 |
| 5,387,905 | 2/1995 | Grube et al. | 340/825.52 |
| 5,634,197 | 5/1997 | Paavonen | 455/512 |
| 5,699,353 | 12/1997 | Kent | 370/315 |
| 5,717,830 | 2/1998 | Sigler et al. | 455/426 |
| 5,815,799 | 9/1998 | Barnes et al. | 455/15 |

FOREIGN PATENT DOCUMENTS

| | | |
|---|---|---|
| 0 390 214 | 3/1990 | European Pat. Off. |
| WO 94/17642 | 1/1994 | WIPO |
| WO 95/06395 | 8/1994 | WIPO |
| WO 96/00482 | 6/1995 | WIPO |
| WO 95/15666 | 1/1999 | WIPO |

OTHER PUBLICATIONS

PCT Notification of Transmittal of the International Search Report or the Declaration, PCT/US98/08632, Oct. 26, 1998.

*Primary Examiner*—Thanh Cong Le
*Assistant Examiner*—Charles N. Appiah
*Attorney, Agent, or Firm*—Jenkens & Gilchrist

[57] ABSTRACT

An improved trunked radio repeater system and method providing an alternative communication mechanism for contacting a dispatcher within the system when the user's assigned group is busy. Using a priority call button on a hand-held radio unit, a user may indicate their desire to prioritize their call in a non-emergency manner and forward a message to their group's dispatcher otherwise occupied by routine group activity.

29 Claims, 5 Drawing Sheets

SYSTEM AND METHOD FOR PRIORITY GROUP ACCESS

BACKGROUND OF THE PRESENT INVENTION

1. Field of the Invention

The present invention is generally directed to the art of trunked radio repeater systems, particularly, to a trunked radio repeater system and method providing improved communications capability for the users thereof, and, more particularly, to an improved system and method for providing a priority communication channel for use in non-emergency situations.

2. Background and Objects of the Present Invention

Systems employing repeater trunking, i.e., time-sharing of a single repeater communication channel among a multiplicity of users, are well-known, as described in applicant's U.S. Pat. Nos. 5,369,783 and 5,483,670. One of the important usages for trunked radio repeater systems is for public service trunked (PST) systems, such as the system 10 generally illustrated in FIG. 1, in which radio communications between a control site 12, containing radio repeaters, and numerous individual hand-held and other mobile radio units 14 within different metropolitan agencies are provided. As is well-known to those familiar with trunking theory, a relatively small number of such radio repeaters can efficiently service all of the needs of a public service organization within a given geographic area if they are trunked (i.e., shared on an "as-needed" basis between all potential units).

At present there are two types of trunking that may be used in the radio repeater system 10: transmission and message trunking. Typical systems, such as assignee's Enhanced Digital Access Communications System (EDACS), employ transmission trunking in group calls. Transmission trunking means that a working channel is assigned for the duration of a caller's transmission, as will be discussed in more detail hereinafter. All the other members of the called group, however, are prevented from transmitting (transmission lockout) for the duration of the message. Upon the caller's un-key, i.e., release of a Push-To-Talk (PTT) button on the aforedescribed hand-held radio 14, the system 10 immediately deallocates (tears down) the channel and makes it available for reassignment, which translates to substantially zero seconds of hang or unused time.

In message trunking systems, such as used by Motorola, however, the allocation of a particular working channel lasts longer, sometimes for at least several seconds after the user quits, i.e., stops transmitting, awaiting response from another radio. If another user responds within the predetermined period of hang time, then that working channel is used, otherwise it is released. Although message trunking may be useful in particular instances, e.g., one working channel for the duration of an emergency, message trunking is inefficient for general usage because of the necessary gaps or pauses between the users. With increased teardown and channel reallocation capabilities in current devices, particularly, using assignee's EDACS technology, it should, therefore, be apparent that transmission trunking is more efficient by eliminating hang time. Accordingly, for simplicity, the discussion hereinafter will be directed to such systems. It should, nonetheless, be understood that principles of the present invention described hereinafter, may be utilized in both transmission and message trunked systems, as is understood by those skilled in the art.

Trunked radio communications systems assign communications channels on an "as needed" basis for the exclusive use of calling mobile units requesting communications and to the group of mobile units being called. It is possible to provide much additional flexibility by pre-programming mobile units 14 in advance with several different group identifications (thus making a given mobile unit 14 a "member" of several different groups of transceivers). Since the number of groups the system can support is limited only by the RF signaling protocol providing identification of groups (and the programming capabilities of the mobile transceivers), it is possible to provide an almost arbitrarily large number of different logical groupings of transceivers as described in the aforementioned U.S. Pat. No. 5,369,783.

This trunked arrangement provides for much additional flexibility. For example, referring again to FIG. 1, a first group might be formed by all members of police squad A; a second group might consist of all members of police squad A and B; a third group might consist of a subset of police squad A (e.g., certain detectives and a supervisor); a fourth group might consist of all police supervisors from squads A and B; a fifth group might consist of all members of police squad A and all members of the rescue squad, etc.

Even though all groups are in effect "reusing" the same communications channels in this transmission trunked radio system, the trunking is mostly transparent to individual users. That is, when a police officer in police squad A switches his "channel" (actually group) selector switch to correspond to the first group and actuates his "push-to-talk" (PTT) microphone switch to make a call, his transceiver and all other active transceivers of police squad A are automatically controlled to switch to a free "working" channel temporarily dedicated to their use and no other mobile transceivers are permitted to monitor or participate in the communications over this channel.

This privacy feature afforded by trunked communications systems is important for providing each group of users with efficient, reliable communications, is critical for certain sensitive communications services (e.g., the police narcotics and detective squads) and is also critical for preventing interference from other users (e.g., the driver of a snow removal vehicle cannot interfere with communications between members of police squad A no matter what the snow truck driver does with his transceiver). Thus, in this respect the trunked system behaves from a user's view point like the prior systems in which each service had a channel dedicated to its exclusive use, while providing the radio spectrum and cost economy derived from channel and repeater sharing.

With reference now to FIG. 2, there is illustrated a more detailed depiction of the control site 12. As illustrated, individual units 14 of various groups communicate with each other via shared radio repeater channels. A dispatch console 16 may be housed directly at a repeater station site 18 or may be remotely located at other communication facilities, connected via transmission wires 20, for example, as is understood by those skilled in the art. It should also be understood that the system 10 may employ multiple dispatch consoles 16, e.g., one for each separate fleet, and a master or supervisory console for the entire system. As shown in FIGS. 1 and 2, the individual units 14 within the various groups constitute hand-held two-way radios or other such devices, for example, a radio communications system mounted within the particular vehicle, as is understood in the art.

In the aforedescribed trunked radio repeater system 10, the compartmentalization of the radio transceivers into groups is essential to effective reliable and private communications, as further discussed in the aforementioned U.S. Pat. No. 5,369,783.

Shown in FIG. 3 is an example of a currently-used communication methodology employed in one of the individual units 14 and dispatch console 16, as shown in FIGS. 1 and 2, within the trunked radio repeater system 10. For example, the aforementioned police squad A policeman's hand-held unit or walkie-talkie 14, shown in more detail in FIG. 4, remains in idle mode (box 30) when the system 10 is not in use. The unit 14 monitors the control channel for any transmissions. A transmission is indicated by a channel assignment message on the control channel instructing the group of radios to go to a specified channel to receive a call, as is well understood by those skilled in the art. If so, then the call is immediately processed (box 34) and, upon call completion, control is shifted back to idle mode (box 30). As discussed, in transmission trunked systems all of the members of the group receiving the sender's message are locked out from transmitting for the duration of the call (box 34) thereby being forced to listen.

When no call is being received (box 32), then an assessment is made whether the user of that unit 14, i.e., the policeman in squad A, is pressing his Push-To-Talk (PTT) button 14A (box 36) on his hand-held portable radio or walkie-talkie 14, as shown in FIG. 4, indicating his desire to transmit a message to the other members within that group (and/or other groups in combination therewith). If the PTT button 14A is not depressed, then control reverts back to idle mode (box 30), as described hereinbefore.

If, however, the policeman is attempting to communicate, for example, with the other policemen and policewomen within his group, then such communication is attempted (box 38) and if successful (box 40), then the transmission is sent (box 42) to the group(s) designated. If not (box 40), then control is transferred back to idle mode (box 30). As discussed, in transmission trunked radio repeater systems, when one user talks, all other users (also on the same channel) are locked out (transmission lockout) until the transmission terminates. It should, accordingly, be understood that when a group has heavy use, a waiting user within that group must compete for access with all the other group members, regardless of the criticality of the message.

It should, therefore, be further understood that in the methodology shown in FIG. 3 a given user's monopolization of the group communication pathway shuts out all the other users indefinitely. Applicant has observed that this problem has lead to group users feeling frustrated, despite a plethora of available alternate channels on the system. Further, when the talkative user finishes, all the other users must rush in en masse to get access, perpetrating the lock-out frustration. The only way another user could obtain immediate attention within the group would then be by declaring an emergency, i.e., hitting an emergency button 14B, also shown in FIG. 4, which switches all the users to a new channel for the group emergency message, as is understood in the art.

Unfortunately, there is no middle ground in current systems, i.e., no way that a user can immediately obtain the attention of a system dispatcher at the dispatch console 14 without declaring an emergency and without requiring the dispatcher to listen in on another channel, which in transmission trunked systems could be one of many possible channels. Consequently, if the aforementioned squad A policeman wishes to notify the dispatcher of an important but non-critical situation, current systems require him to fight for access with all the other users within that group or declare an emergency.

It is, accordingly, an object of the present invention to provide a system and method whereby a user can gain access to a dispatcher during transmission by another user and contemporaneously communicate with the dispatcher.

It is also an object of the present invention that the aforementioned access be rapid to avoid or ameliorate user frustrations.

It is a further object that the system and method of the present invention be compatible with existing trunk radio repeater system protocols.

SUMMARY OF THE INVENTION

The present invention is directed to an improved trunked radio repeater system and method providing an alternative and concurrent communication mechanism for contacting a dispatcher within the system during use by another user. Using a priority call button on a hand-held radio unit, a user may indicate their desire to prioritize the call in a non-emergency manner and forward a message to the system dispatcher otherwise occupied by another user.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
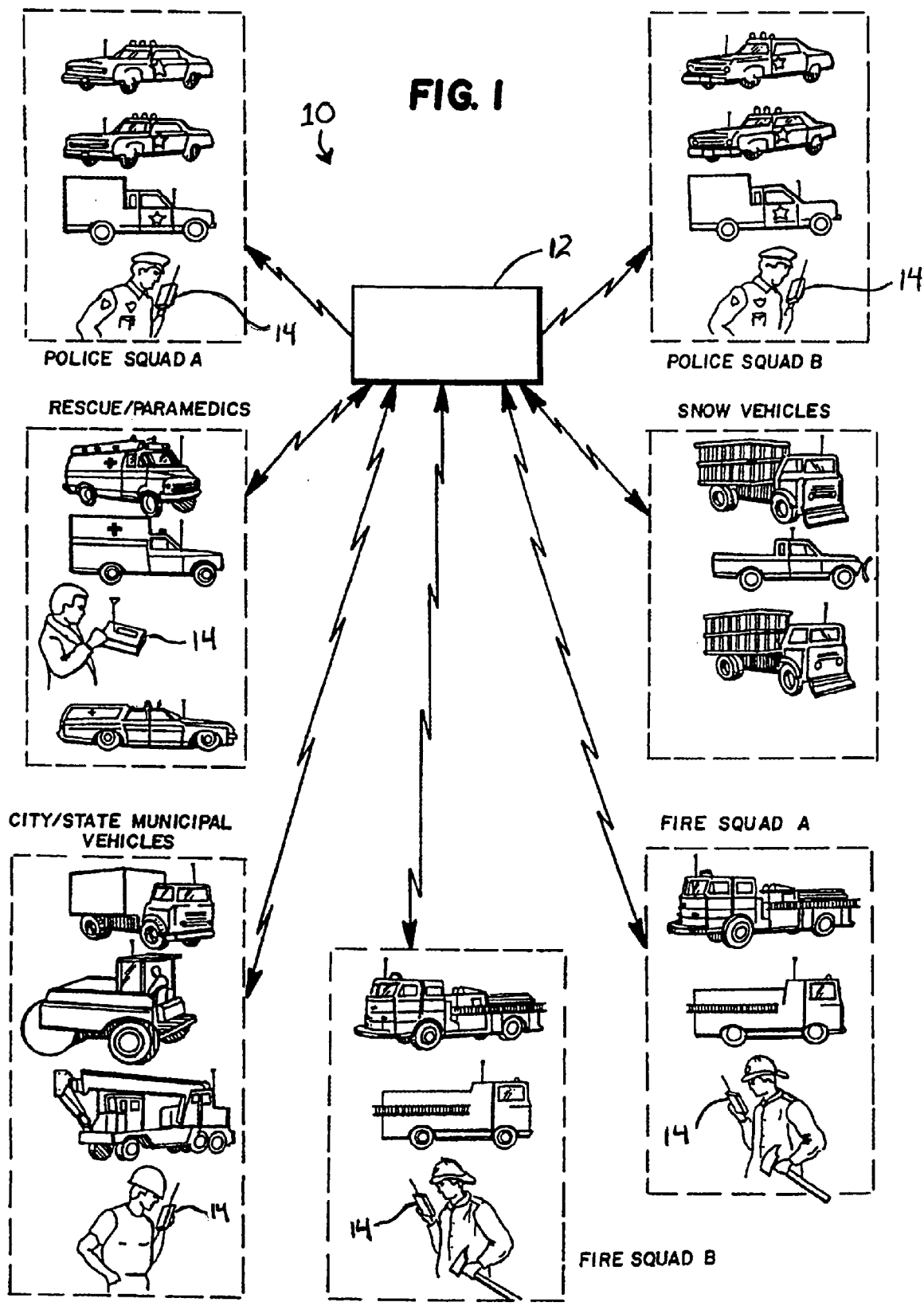
FIG. 1 is a schematic diagram of exemplary user groupings in a typical trunked radio repeater system.
Figure 2:
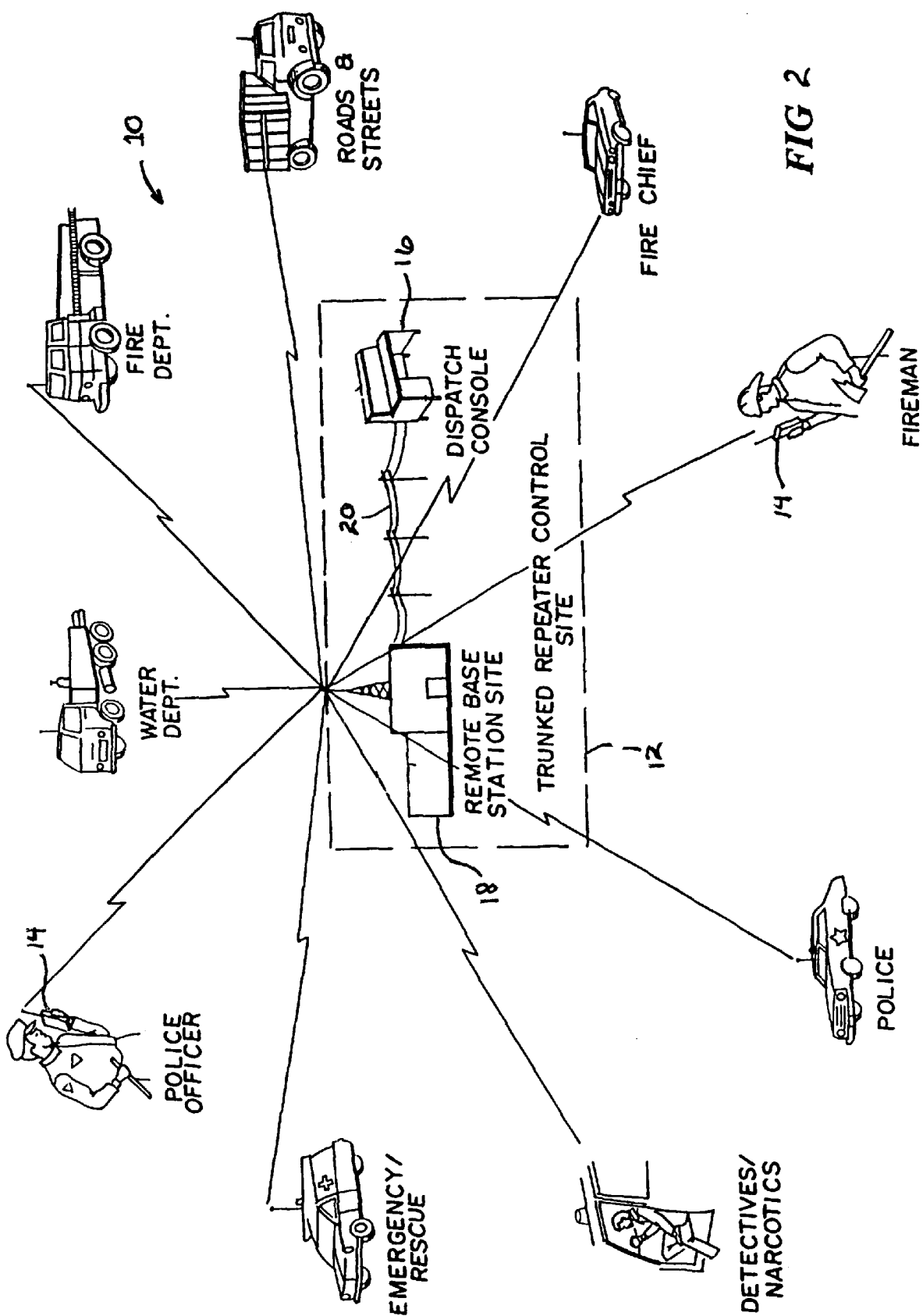
FIG. 2 is a schematic diagram of a control potion of the system shown in FIG. 1.
Figure 5:
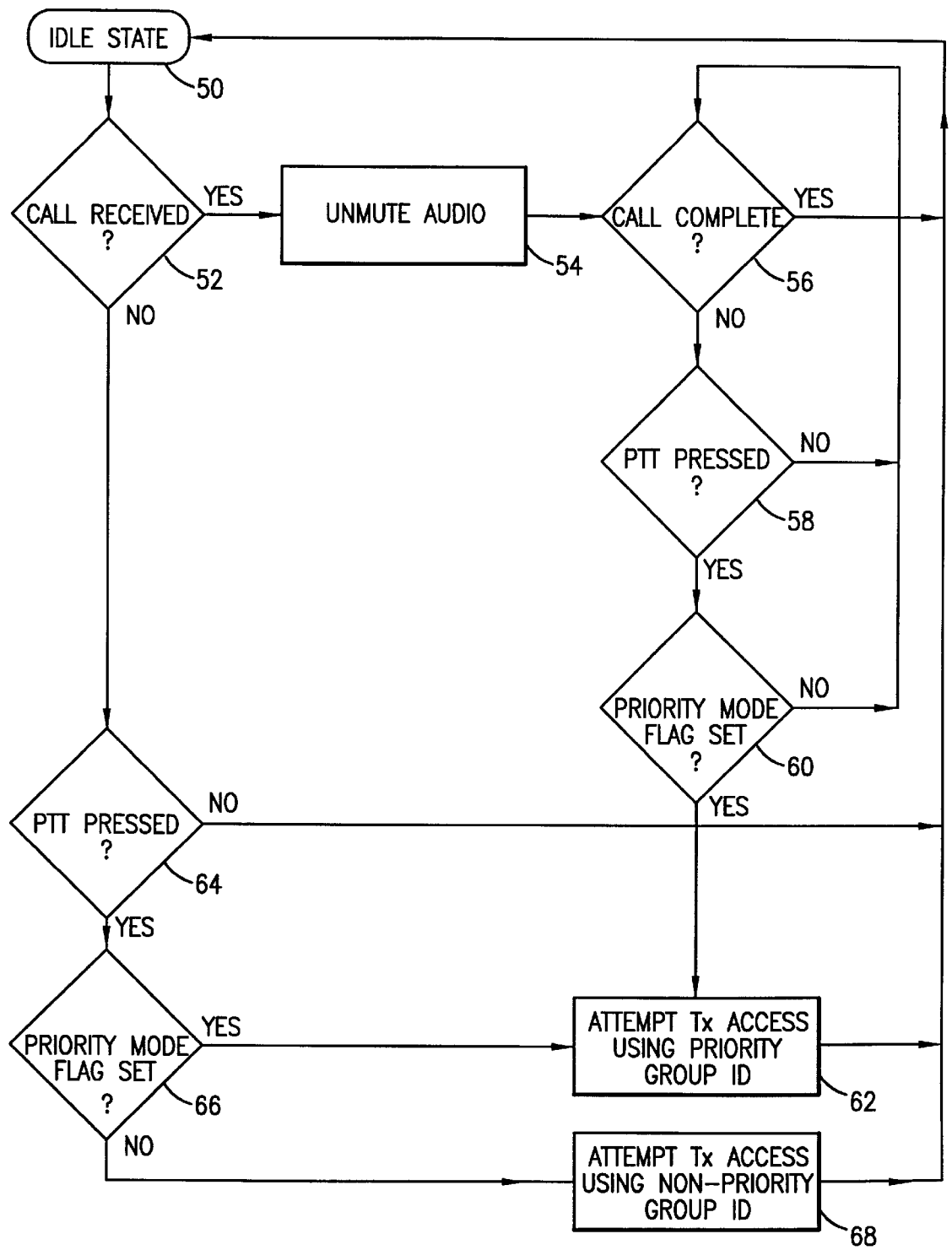
FIG. 5 is a flow chart illustrating methodology followed in trunked radio repeater systems in accordance with the present invention.

With reference now to FIG. 5, there is shown a flow chart illustrating methodology followed by the aforedescribed individual units 14 within trunked radio repeater systems, as depicted in FIGS. 1 and 2, and in accordance with the present invention.

Figure 3:
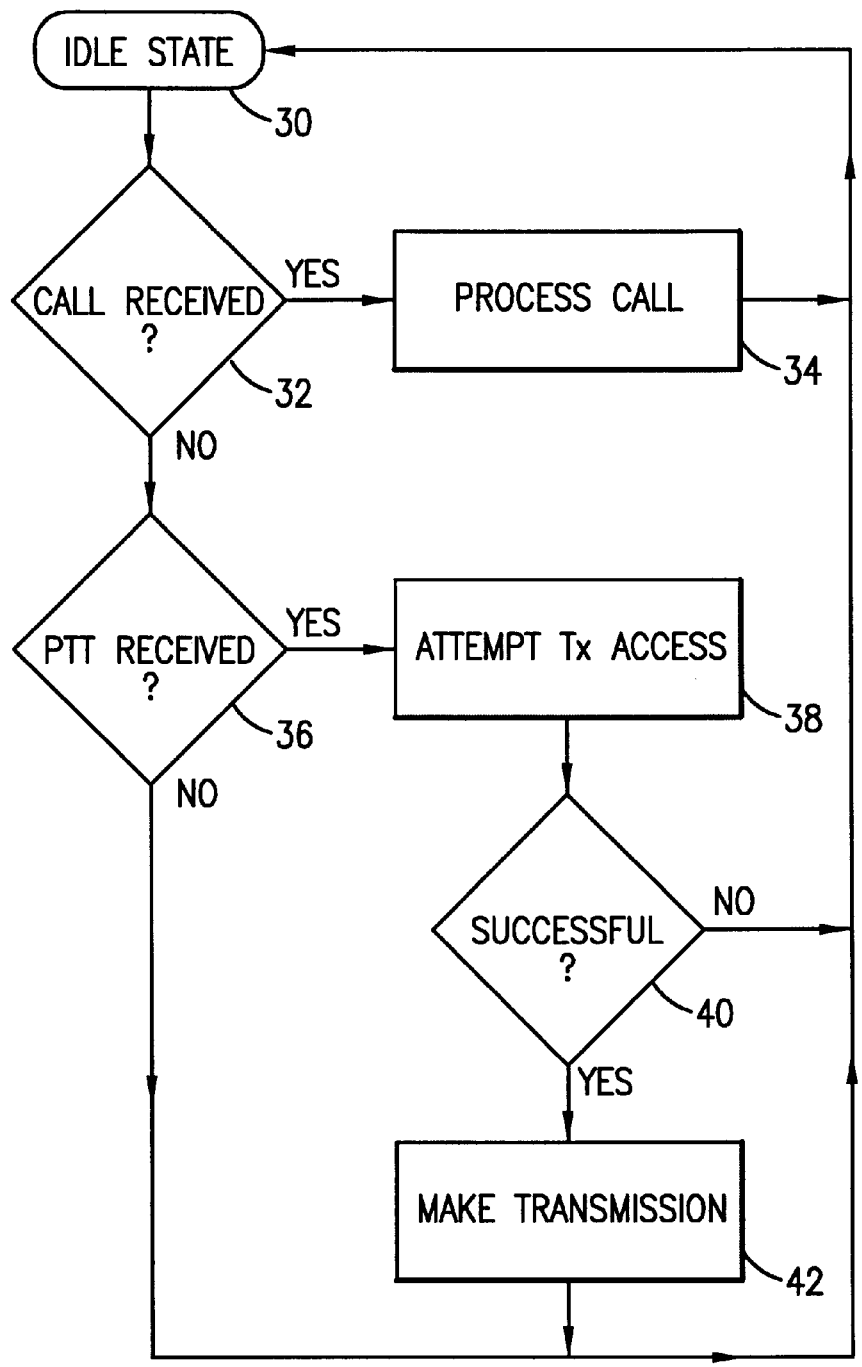
FIG. 3 is a flow chart illustrating methodology followed in a current trunked radio repeater system.

As in the currently-used methodology set forth in FIG. 3, the hand-held unit 14 of the squad A policeman (or other mobile unit 14) remains in idle mode (box 50) when the system 10 is not in use. The unit 14 monitors the control channel for any channel assignments, and, upon receiving such signal, transitions to the assigned channel, unmuting the audio so the user can hear the message (when not receiving a call the radio is muted so the users don't hear control data). When the call has been completed, e.g., the other user has released the PTT button 14A on their individual unit 14, then control is relinquished by that user and the receiving units 14 for that group return to idle mode (box 50).

If the incoming call has not been completed (box 56), then an assessment is made whether the policeman has pressed the PTT button 14A (box 58) on his unit 14, indicating that his intended message has a certain degree of importance and wants to override transmission lockout. If not, then control is transferred to box 56 for re-evaluation. If the PTT button 14A has been depressed, however, then an assessment is made whether a priority mode flag 22A (shown as part of a memory device 22 in FIG. 4) within the particular individual unit 14 in question, i.e., the squad A policeman's unit 14, is set (box 60), e.g., a bit flag 22A within memory 22 representing the status of prioritization for that user is set to logical one. If not, i.e., any message the squad A policeman intends to send is deemed not a priority (and the priority mode bit flag 22A remains logical zero), then control is transferred back to box 56.

Figure 4:
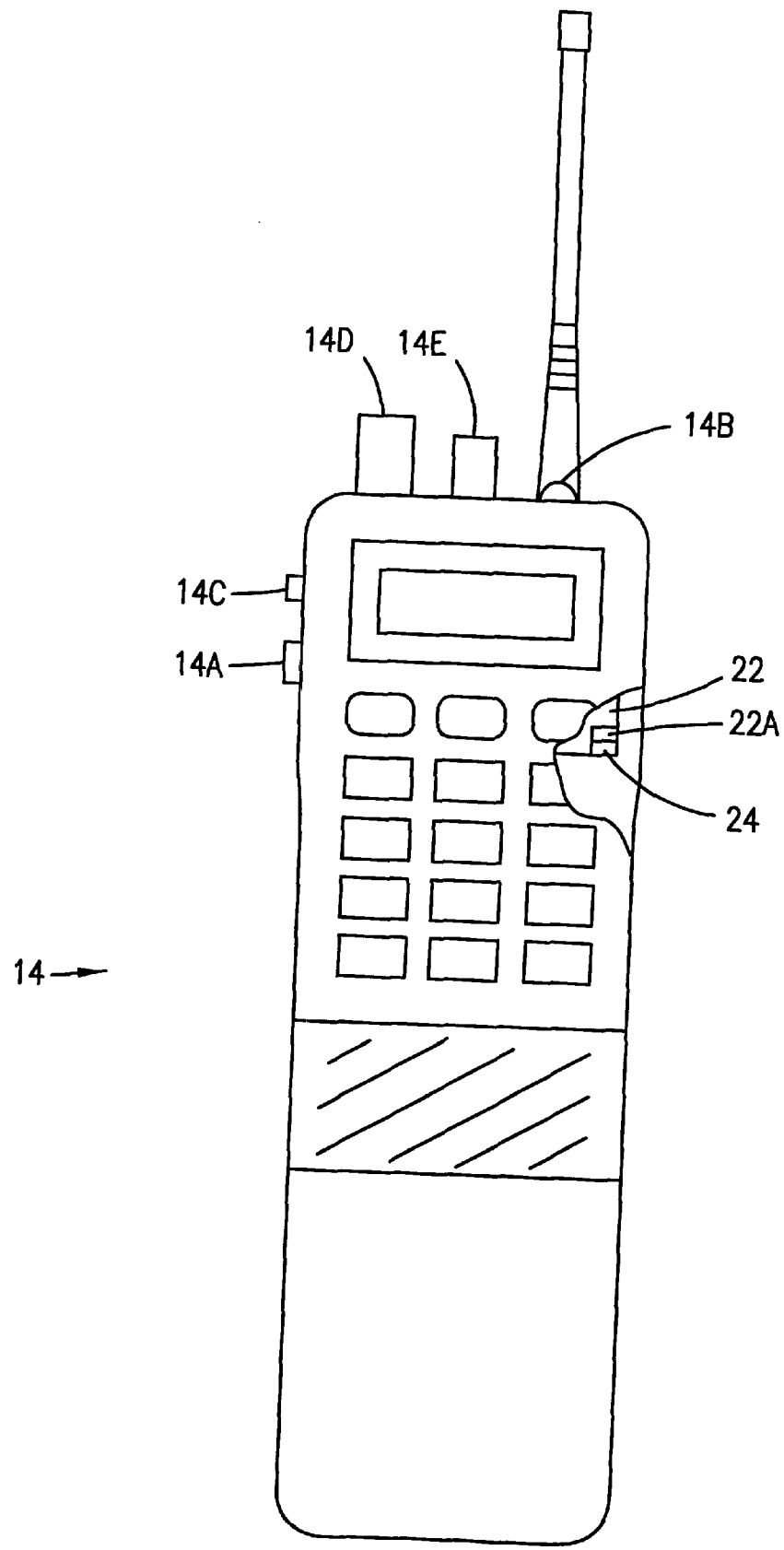
FIG. 4 is a schematic diagram of a hand-held portable radio incorporating the call prioritization subject matter of the present invention for use in the system of FIG. 1.

It should be understood that the priority mode flag 22A, shown in FIG. 4, is preferably set by the individual using the particular unit 14 by pressing a priority button 14C, which may be adjacent PTT button 14A. Depressing button 14C also starts a priority timer 24, also shown in FIG. 4, within the individual unit 14. It should further be understood that the timer 24 may also be a part of memory device 22 within the individual units 14 or be a separate device. At the expiration of the predetermined time period, the priority mode flag 22A reverts to the default setting of zero, i.e., no priority is given to outgoing calls.

If the PTT button 14A has been pressed while the priority mode flag 22A is set, however, then the individual unit 14 attempts to transmit the aforedescribed priority message using a priority group ID (box 62). At the dispatch console 14, the aforedescribed priority group, now assigned on a parallel channel, is summed into the audio path for the original group channel, i.e., the dispatcher at console 14 hears both the original and the parallel channels simultaneously. Accordingly, the aforementioned squad A policeman may reliably communicate important, albeit non-emergency, information to the dispatcher during another's transmission and without declaring an emergency. At channel drop, i.e., when the policeman completes his priority message on the parallel channel and releases the PTT button 14A, the walkie-talkie 14 switches back to the original group, which may be on the same channel as before or another, as is understood by those skilled in the art.

With reference back to the call received box 52 in FIG. 5, if no call has been received, then the individual unit 14 in question checks if the user has pressed the PTT button 14A (box 54). If not, then control reverts to idle mode (box 50), awaiting a further signal. If the PTT button 14A has been pressed, however, then the individual unit 14 checks if the aforementioned priority mode flag 22A within memory 22 therein has been set (box 66). If so, then the individual unit 14 attempts to transmit that message as a priority message on the aforementioned priority group access channel (box 62) to the dispatcher in the summation manner described. At channel drop, control reverts to idle mode (box 50), as discussed. If the priority mode flag 22A is not set, however, then the individual unit 14 attempts to transmit the message on a non-priority group ID (box 68), i.e., the normal group as discussed in connection with the current methodology in FIG. 3, which, as discussed, is subject to transmission lockout. At call completion, control reverts to idle mode (box 50), as discussed.

In the aforedescribed manner, users that have urgent, albeit not emergency, traffic may communicate with the dispatcher contemporaneously with the normal traffic in progress.

A system 10 employing the subject matter of the present invention, as set forth in detail above, is advantageous for its ease of use. From the mobile radio user's perspective, if the designated group is busy and the user must speak with the dispatcher, the user pushes the priority button 14C, activating timer 24, and then presses the PTT button 14A within the allotted time set by the timer 24. Communication is thereby established with the dispatcher despite the traffic on the group. The priority user's message, however, does not interfere with the ongoing group traffic, being assigned a different channel. Further, the dispatcher at console 16 does not have any RF interference between the priority user and anyone else within the group. From the dispatcher's perspective, although the group is busy, the dispatcher can nonetheless hear the important communique from the prioritizing user summed in with the group's audio (but without any RF interference).

It should be understood that the priority button 14C, indicated in FIG. 4 on the side of the hand-held unit 14, may be placed elsewhere on the unit 14, e.g., at the top portion next to the aforedescribed emergency button 14B or by a selection switch 14D or a volume switch 14E, on the keypad, or along the sides, as is understood in the art.

As discussed hereinbefore, although the description set forth herein has been directed towards transmission trunking systems, the priority mode features of the present invention are also applicable within message trunked systems, as is understood by those skilled in the art, and should, therefore, be considered within the scope of the claims.

The previous description is of a preferred embodiment for implementing the invention, and the scope of the invention should not necessarily be limited by this description. The scope of the present invention is instead defined by the following claims.

What is claimed is:

1. A radio unit in a trunked radio repeater system, said radio unit and a plurality of other radio units being in communication with a dispatch center within said system via a digital control channel and a multiplicity of working channels, one of said working channels being assigned for temporary use by said radio unit and said other radio units specified by digital control signals on the control channel, circuitry within said radio unit for providing a second working channel for concurrent communication by said radio unit with said dispatch center, said circuitry comprising:

a transceiver portion, within said radio unit, for transceiving signals on said control channel and said multiplicity of working channels, said transceiver portion monitoring said control channel for channel assignments on one of plural predetermined call groups, said radio unit and said plurality of other radio units constituting a first predetermined call group and being in communication with each other and with said dispatch center via said one working channel; and a priority mode flag, within said radio unit, said radio unit communicating with said dispatch center on said second working channel when said priority mode flag is set, said dispatch center maintaining communication with said other radio units within said first predetermined call group on said first working channel during said second working channel communication, wherein upon establishment of said second working channel concurrent with said first working channel, an audio signal from said radio unit on said second working channel is combined at said dispatch center with an audio signal on said first working channel.

2. The radio unit according to claim 1, wherein said trunked radio repeater system is a message trunked system.

3. The radio unit according to claim 1, wherein said trunked radio repeater system is a transmission trunked system.

4. The radio unit according to claim 1, wherein said trunked radio repeated system employs message trunking and transmission trunking.

5. The radio unit according to claim 1, further comprising a priority button, whereby when said priority button is pressed, said priority mode flag is set.

6. The radio unit according to claim 1, further comprising a timer, whereby said priority mode flag remains set for a given time duration determined by said timer, said priority mode flag reverting to a default setting upon the expiration of said timer.

7. The radio unit according to claim 6, wherein said timer is within a memory device within said radio unit.

8. The radio unit according to claim 6, wherein said default setting is zero.

9. The radio unit according to claim 1, further comprising a push-to-talk button on said radio unit, whereby if said push-to-talk button is pressed while said priority mode flag is set, said radio unit communicates with said dispatch center on said second working channel.

10. The radio unit according to claim 1, wherein upon termination of said second working channel communication, said radio unit is returned to said first predetermined call group on said one working channel.

11. The radio unit according to claim 1, wherein said radio unit is a hand-held, two-way radio.

12. In a trunked radio repeater system having a dispatch center and a multiplicity of individual radio units in communication therewith via a digital control channel and a multiplicity of working channels, one of said working channels being assigned for temporary use by a plurality of said individual units specified by digital control signals on the control channel, circuity within said trunked radio repeaters system for providing a second working channel for concurrent communication by one of said plurality of said individual radio units with said dispatch center, said circuitry comprising:

a transceiver within said dispatch center, said transceiver monitoring said control channel for channel assignments to each of plural predetermined call groups, said plurality of individual radio units constituting a first predetermined call group and being in communication with each other and with said dispatch center via said one working channel; and communication means for said one individual radio unit within said first predetermined call group to communicate with said dispatch center via said second working channel when a priority mode flag within said one individual radio unit is set, said dispatch center maintaining communication with the other of said individual radio units within the first predetermined call group on said first working channel during said second working channel communication, wherein upon establishment of said second working channel concurrent with said first working channel an audio signal from said individual radio unit on said second working channel is combined at said dispatch center with an audio signal on said first working channel.

13. The trunked radio repeater system according to claim 12, wherein said system is a message trunked system.

14. The trunked radio repeater system according to claim 12, wherein said system is a transmission trunked system.

15. The trunked radio repeater system according to claim 12, wherein said trunked radio repeater system employs message trunking and transmission trunking.

16. The trunked radio repeater system according to claim 12, wherein said dispatch center comprises a master dispatch center and a plurality of secondary dispatch centers, each of said secondary dispatch centers corresponding to a fleet of individual radio units.

17. The trunked radio repeater system according to claim 12, wherein said individual radio units are hand-held, two-way radios.

18. The trunked radio repeater system according to claim 12, wherein said one individual radio unit includes a timer therein, whereby said priority mode flag remains set for a time duration determined by said timer, said priority mode flag reverting to a default setting upon the expiration of said timer.

19. The trunked radio repeater system according to claim 18, wherein said timer is within a memory device within said individual radio unit.

20. The trunked radio repeater system according to claim 18, wherein said default setting is zero.

21. The trunked radio repeater system according to claim 12, further comprising a push-to-talk button on said individual radio unit, whereby if said push-to-talk button is pressed while said priority mode flag is set, said individual radio unit communicates with said dispatch center on said second working channel.

22. The radio unit according to claim 12, wherein upon termination of said second working channel communication, said individual radio unit is returned to said first predetermined call group on said one working channel.

23. A method for communication within a trunked radio repeater system having a dispatch center and a multiplicity of individual radio units in communication therewith via a digital control channel and a multiplicity of working channels, one of said working channels being assigned for temporary use by a plurality of said individual radio units specified by digital control signals on the control channel, one of said plurality of individual radio units in communication with said dispatch center on a second working channel, said method comprising the steps of:

monitoring, by a transceiver within said dispatch center, said control channel for channel assignments to each of plural predetermined call groups, said plurality of individual radio units constituting a first predetermined call group and being in communication with each other and with said dispatch center via said one working channel, said transceiver further monitoring said control channel during said one working channel communication for a priority communique from said one individual radio unit, upon receipt of said priority communique, establishing said second working channel for communication between said one individual radio unit and said dispatch center, said priority communique being concurrent with said one working channel communication, and upon termination of said priority communique involving said one individual radio unit, returning said one individual radio unit to said first predetermined call group on said one working channel, wherein, in said step of establishing, an audio signal from said priority communique on said second working channel is combined at said dispatch center with an audio signal on said first working channel.

24. The method according to claim 23, wherein said trunked radio repeater system is a message trunked system.

25. The method according to claim 23, wherein said trunked radio repeater system is a transmission trunked system.

26. The method according to claim 23, wherein said trunked radio repeater system employs message trunking and transmission trunking.

27. The method according to claim 23, further comprising, in said step of monitoring for said priority communique, pressing a priority button on said one individual radio unit and setting a priority mode flag therein.

28. The method according to claim 27, further comprising, in said step of establishing said second working channel, setting a timer within said one individual radio unit for a given time duration, said priority mode flag being set during said given time duration.

29. The method according to claim 27, further comprising, in said step of establishing said second working channel, pressing a push-to-talk button on said one individual radio unit, whereby if said push-to-talk button is pressed while said priority mode flag is set, said second working channel is established.

* * * * *